(12) United States Patent
Khakhalev et al.

(10) Patent No.: US 9,496,544 B2
(45) Date of Patent: Nov. 15, 2016

(54) BATTERY MODULES HAVING INTERCONNECT MEMBERS WITH VIBRATION DAMPENING PORTIONS

(75) Inventors: Alex Khakhalev, San Diego, CA (US); Igor Isayev, Farmington Hills, MI (US)

(73) Assignee: LG Chem. Ltd., Seoul (KR)

( * ) Notice: Subject to any disclaimer, the term of this patent is extended or adjusted under 35 U.S.C. 154(b) by 927 days.

(21) Appl. No.: 13/193,169

(22) Filed: Jul. 28, 2011

(65) Prior Publication Data

US 2013/0029204 A1 Jan. 31, 2013

(51) Int. Cl.
| | |
|---|---|
| H01M 2/22 | (2006.01) |
| H01M 2/34 | (2006.01) |
| H01M 2/20 | (2006.01) |
| H01M 2/02 | (2006.01) |

(52) U.S. Cl.
CPC ............ *H01M 2/347* (2013.01); *H01M 2/206* (2013.01); *H01M 2/0212* (2013.01)

(58) Field of Classification Search
CPC ........... H01M 2/22–2/24; H01M 2/202–2/208
USPC .................................................. 429/158, 160
See application file for complete search history.

(56) References Cited

U.S. PATENT DOCUMENTS

| | | |
|---|---|---|
| 2,273,244 A | 2/1942 | Ambruster |
| 3,503,558 A | 3/1970 | Galiulo et al. |
| 3,522,100 A | 7/1970 | Lindstrom |
| 4,390,841 A | 6/1983 | Martin et al. |
| 4,396,689 A | 8/1983 | Grimes et al. |
| 4,409,304 A | 10/1983 | Gerard et al. |
| 5,071,652 A | 12/1991 | Jones et al. |
| 5,270,131 A | 12/1993 | Diethelm et al. |
| 5,346,786 A | 9/1994 | Hodgetts |
| 5,354,630 A | 10/1994 | Earl et al. |
| 5,364,711 A | 11/1994 | Yamada et al. |
| 5,385,793 A | 1/1995 | Tiedemann et al. |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Barbara Gilliam
*Assistant Examiner* — Helen M McDermott
(74) *Attorney, Agent, or Firm* — Buckert Patent & Trademark Law Firm, PC; John F. Buckert

(57) ABSTRACT

Battery modules having interconnect members are provided. An interconnect member includes a first plate portion having a first thickness. The interconnect member further includes a second plate portion having a second thickness equal to the first thickness. The second plate portion extends generally parallel to the first plate portion. The interconnect member further includes a first vibration dampening portion coupled to the first and second plate portions. The first vibration dampening portion has a third thickness greater than the first thickness, such that vibrations induced on the first plate portion are attenuated when a portion of the vibrations pass through the first vibration dampening portion to the second plate portion.

15 Claims, 14 Drawing Sheets

(56) References Cited

U.S. PATENT DOCUMENTS

| | | |
|---|---|---|
| 5,487,955 A | 1/1996 | Korall et al. |
| 5,487,958 A | 1/1996 | Tura |
| 5,503,948 A | 4/1996 | Mackay et al. |
| 5,510,203 A | 4/1996 | Hamada et al. |
| 5,520,976 A | 5/1996 | Giannetti et al. |
| 5,561,005 A | 10/1996 | Omaru et al. |
| 5,589,290 A | 12/1996 | Klink et al. |
| 5,606,242 A | 2/1997 | Hull et al. |
| 5,639,571 A | 6/1997 | Waters et al. |
| 5,652,502 A | 7/1997 | van Phuc et al. |
| 5,658,682 A | 8/1997 | Usuda et al. |
| 5,663,007 A | 9/1997 | Ikoma et al. |
| 5,693,432 A | 12/1997 | Matsumoto |
| 5,756,227 A | 5/1998 | Suzuki et al. |
| 5,796,239 A | 8/1998 | can Phuoc et al. |
| 5,825,155 A | 10/1998 | Ito et al. |
| 5,856,041 A | 1/1999 | Inoue et al. |
| 5,982,403 A | 11/1999 | Inagaki |
| 6,016,047 A | 1/2000 | Notten et al. |
| 6,023,146 A | 2/2000 | Casale et al. |
| 6,099,986 A | 8/2000 | Gauthier et al. |
| 6,117,584 A | 9/2000 | Hoffman et al. |
| 6,121,752 A | 9/2000 | Kitihara et al. |
| 6,257,328 B1 | 7/2001 | Fujiwara et al. |
| 6,261,719 B1 | 7/2001 | Ikeda et al. |
| 6,353,815 B1 | 3/2002 | Vilim et al. |
| 6,362,598 B2 | 3/2002 | Laig-Horstebrock et al. |
| 6,406,812 B1 | 6/2002 | Dreulle et al. |
| 6,413,678 B1 | 7/2002 | Hamamoto et al. |
| 6,422,027 B1 | 7/2002 | Coates, Jr. et al. |
| 6,441,586 B1 | 8/2002 | Tate, Jr. et al. |
| 6,448,741 B1 | 9/2002 | Inui et al. |
| 6,462,949 B1 | 10/2002 | Parish, IV et al. |
| 6,475,659 B1 | 11/2002 | Heimer |
| 6,515,454 B2 | 2/2003 | Schoch |
| 6,521,363 B1 | 2/2003 | Yeh |
| 6,534,954 B1 | 3/2003 | Plett |
| 6,555,264 B1 | 4/2003 | Hamada et al. |
| 6,563,318 B2 | 5/2003 | Kawakami et al. |
| 6,709,783 B2 | 3/2004 | Ogata et al. |
| 6,724,172 B2 | 4/2004 | Koo |
| 6,771,502 B2 | 8/2004 | Getz, Jr. et al. |
| 6,773,301 B1 | 8/2004 | Chaskin |
| 6,780,538 B2 | 8/2004 | Hamada et al. |
| 6,821,671 B2 | 11/2004 | Hinton et al. |
| 6,829,562 B2 | 12/2004 | Sarfert |
| 6,832,171 B2 | 12/2004 | Barsoukov et al. |
| 6,876,175 B2 | 4/2005 | Schoch |
| 6,886,249 B2 | 5/2005 | Smalc |
| 6,892,148 B2 | 5/2005 | Barsoukov et al. |
| 6,927,554 B2 | 8/2005 | Tate, Jr. et al. |
| 6,943,528 B2 | 9/2005 | Schoch |
| 6,967,466 B2 | 11/2005 | Koch |
| 6,982,131 B1 | 1/2006 | Hamada et al. |
| 7,012,434 B2 | 3/2006 | Koch |
| 7,026,073 B2 | 4/2006 | Ueda et al. |
| 7,039,534 B1 | 5/2006 | Ryno et al. |
| 7,061,246 B2 | 6/2006 | Dougherty et al. |
| 7,072,871 B1 | 7/2006 | Tinnemeyer |
| 7,074,517 B2 | 7/2006 | Higashino |
| 7,098,665 B2 | 8/2006 | Laig-Hoerstebrock |
| 7,109,685 B2 | 9/2006 | Tate, Jr. et al. |
| 7,126,312 B2 | 10/2006 | Moore |
| 7,147,045 B2 | 12/2006 | Quisenberry et al. |
| 7,197,487 B2 | 3/2007 | Hansen et al. |
| 7,199,557 B2 | 4/2007 | Anbuky et al. |
| 7,229,327 B2 | 6/2007 | Zhao et al. |
| 7,250,741 B2 | 7/2007 | Koo et al. |
| 7,251,889 B2 | 8/2007 | Kroliczek et al. |
| 7,253,587 B2 | 8/2007 | Meissner |
| 7,264,902 B2 | 9/2007 | Horie et al. |
| 7,270,576 B2 | 9/2007 | Kim et al. |
| 7,270,912 B2 | 9/2007 | Oogami |
| 7,294,020 B2 | 11/2007 | Zhao et al. |
| 7,315,789 B2 | 1/2008 | Plett |
| 7,321,220 B2 | 1/2008 | Plett |
| 7,327,147 B2 | 2/2008 | Koch |
| 7,400,115 B2 | 7/2008 | Plett |
| 7,446,504 B2 | 11/2008 | Plett |
| 7,479,758 B2 | 1/2009 | Moon |
| 7,507,124 B2 | 3/2009 | Kim |
| 7,518,339 B2 | 4/2009 | Schoch |
| 7,521,895 B2 | 4/2009 | Plett |
| 7,525,285 B2 | 4/2009 | Plett |
| 7,563,137 B1 | 7/2009 | Koetting et al. |
| 7,578,702 B1 | 8/2009 | Tom et al. |
| 7,583,059 B2 | 9/2009 | Cho |
| 7,589,532 B2 | 9/2009 | Plett |
| 7,642,746 B2 | 1/2010 | Kim et al. |
| 7,656,122 B2 | 2/2010 | Plett |
| 7,723,957 B2 | 5/2010 | Plett |
| 7,794,868 B2 | 9/2010 | Yang |
| 7,883,793 B2 | 2/2011 | Niedzwiecki et al. |
| 8,035,986 B2 | 10/2011 | Koetting et al. |
| 2001/0046624 A1 | 11/2001 | Goto et al. |
| 2001/0049055 A1 | 12/2001 | Saito |
| 2003/0027039 A1 | 2/2003 | Benson et al. |
| 2003/0082440 A1 | 5/2003 | Mrotek et al. |
| 2003/0184307 A1 | 10/2003 | Kozlowski et al. |
| 2003/0190522 A1* | 10/2003 | Ogata ............................ 429/179 |
| 2003/0213121 A1 | 11/2003 | Rouillard et al. |
| 2004/0043663 A1 | 3/2004 | Ikeda et al. |
| 2005/0026014 A1 | 2/2005 | Fogaing et al. |
| 2005/0031945 A1 | 2/2005 | Morita et al. |
| 2005/0031946 A1* | 2/2005 | Kruger et al. ................. 429/159 |
| 2005/0100786 A1 | 5/2005 | Ryu et al. |
| 2005/0127874 A1 | 6/2005 | Lim et al. |
| 2005/0130033 A1 | 6/2005 | Iwamura et al. |
| 2005/0134038 A1 | 6/2005 | Walsh |
| 2006/0100833 A1 | 5/2006 | Plett |
| 2006/0127754 A1 | 6/2006 | Hamada et al. |
| 2006/0177733 A1 | 8/2006 | Ha et al. |
| 2006/0194101 A1 | 8/2006 | Ha et al. |
| 2006/0234558 A1 | 10/2006 | Li |
| 2006/0246781 A1 | 11/2006 | Yoon et al. |
| 2007/0037051 A1 | 2/2007 | Kim et al. |
| 2007/0087266 A1 | 4/2007 | Bourke et al. |
| 2007/0238018 A1 | 10/2007 | Lee et al. |
| 2008/0124617 A1 | 5/2008 | Bjork |
| 2008/0169788 A1 | 7/2008 | Bobbin et al. |
| 2008/0254356 A1 | 10/2008 | Liersch et al. |
| 2009/0029239 A1 | 1/2009 | Koetting et al. |
| 2009/0139781 A1 | 6/2009 | Straubel |
| 2009/0186265 A1 | 7/2009 | Koetting et al. |
| 2009/0325042 A1 | 12/2009 | Koetting et al. |
| 2009/0325051 A1 | 12/2009 | Niedzwiecki et al. |
| 2009/0325052 A1 | 12/2009 | Koetting et al. |
| 2009/0325053 A1 | 12/2009 | Koetting et al. |
| 2009/0325054 A1 | 12/2009 | Payne et al. |
| 2009/0325055 A1 | 12/2009 | Koetting et al. |
| 2010/0062329 A1 | 3/2010 | Muis |
| 2010/0086842 A1 | 4/2010 | Yang |
| 2010/0105258 A1* | 4/2010 | Koetting et al. ............... 439/883 |
| 2010/0151312 A1 | 6/2010 | Kim et al. |
| 2010/0247998 A1 | 9/2010 | Hostler et al. |
| 2010/0266883 A1 | 10/2010 | Koetting et al. |
| 2010/0275619 A1 | 11/2010 | Koetting et al. |
| 2010/0276132 A1 | 11/2010 | Payne |
| 2010/0279152 A1 | 11/2010 | Payne |
| 2010/0279153 A1 | 11/2010 | Payne |
| 2010/0279154 A1 | 11/2010 | Koetting et al. |
| 2011/0027625 A1 | 2/2011 | Payne |
| 2011/0027640 A1 | 2/2011 | Gadawski et al. |
| 2011/0052959 A1 | 3/2011 | Koetting et al. |
| 2011/0293994 A1 | 12/2011 | Casoli |
| 2012/0088140 A1 | 4/2012 | Kardasz et al. |
| 2013/0029204 A1 | 1/2013 | Khakhalev et al. |

(56) References Cited

U.S. PATENT DOCUMENTS

| | | | |
|---|---|---|---|
| 2013/0052503 | A1 | 2/2013 | Payne |
| 2013/0052511 | A1 | 2/2013 | Khakhalev |
| 2013/0216878 | A1 | 8/2013 | Merriman et al. |

FOREIGN PATENT DOCUMENTS

| | | | |
|---|---|---|---|
| EP | 0673553 | B1 | 2/2001 |
| EP | 1089373 | A | 4/2001 |
| EP | 1435675 | A1 | 7/2004 |
| EP | 1505670 | A2 | 2/2005 |
| GB | 2084390 | A | 4/1982 |
| JP | 4056079 | A | 2/1992 |
| JP | 8138735 | A | 5/1996 |
| JP | 8222280 | A | 8/1996 |
| JP | 9129213 | A | 5/1997 |
| JP | 09-219213 | | 8/1997 |
| JP | 10199510 | A | 7/1998 |
| JP | 11066949 | A | 3/1999 |
| JP | 11191432 | A | 7/1999 |
| JP | 2000123802 | A | 4/2000 |
| JP | 2000164200 | A | 6/2000 |
| JP | 2002252036 | A | 9/2002 |
| JP | 2003219572 | A | 7/2003 |
| JP | 2003282044 | A | 10/2003 |
| JP | 2004055492 | A | 2/2004 |
| JP | 2004178860 | A | 6/2004 |
| JP | 2005-126315 | | 5/2005 |
| JP | 2007265945 | A | 10/2007 |
| JP | 2008-080995 | | 4/2008 |
| KR | 20020051742 | A | 6/2002 |
| KR | 20020064366 | A | 8/2002 |
| KR | 20060110408 | A | 10/2006 |
| KR | 20070057662 | A | 6/2007 |
| KR | 100765659 | B1 | 10/2007 |
| KR | 20070100555 | A | 10/2007 |
| KR | 20080027504 | A | 3/2008 |
| KR | 20080027505 | A | 3/2008 |
| KR | 20080036258 | A | 4/2008 |
| KR | 20080047641 | A | 5/2008 |
| KR | 100889241 | B1 | 3/2009 |
| KR | 20090095949 | A | 9/2009 |
| KR | 100921346 | B1 | 10/2009 |
| KR | 100996957 | B | 1/2010 |
| KR | 101042611 | B | 1/2010 |
| KR | 20100003146 | A | 1/2010 |
| KR | 101050318 | B | 10/2010 |
| WO | 0030190 | A | 5/2000 |
| WO | 03071616 | A2 | 8/2003 |
| WO | WO03/071616 | A2 | 8/2003 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for for International application No. PCT/KR2009/000258 dated Aug. 28, 2009.
International Search report for for International application No. PCT/KR2009/003434 dated Jan. 18, 2010.
Machine translation of JP 2000 260469.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.
U.S. Appl. No. 13/073,000, filed Mar. 28, 2011 entitled Battery Disconnect Unit and Method of Assembling the Battery Disconnect Unit.
U.S. Appl. No. 13/076,774, filed Mar. 31, 2011 entitled Battery Pack Having Liquid Leak Detection System.
International Search Report for International application No. PCT/KR2012/006812 dated Feb. 27, 2013.
International Search Report for International application No. PCT/KR2012/006813 dated Feb. 14, 2013.
International Search Report for International application No. PCT/KR2013/001174 dated May 13, 2013.
International Search Report for International Patent Application No. PCT/KR2009/003438 dated Jan. 22, 2010.
International Search Report for International Patent Application No. PCT/KR2009/003440 dated Jan. 22, 2010.
U.S. Appl. No. 14/246,178, filed Apr. 7, 2014 entitled Battery Cell Interconnect and Voltage Sensing Assembly and a Battery Module.
U.S. Appl. No. 14/617,230, filed Feb. 9, 2015 entitled Battery Module and Method of Coupling First and Second Electrical Terminals of First and Second Battery Cells to a Voltage Sense Member of an Interconnect Assembly.
U.S. Appl. No. 14/617,344, filed Feb. 9, 2015 entitled Battery Module and Method of Coupling First and Second Electrical Terminals of First and Second Battery Cells to First and Second Voltage Sense Members of an Interconnect Assembly.

\* cited by examiner

STEP 5

STEP 6

STEP 7

STEP 8

STEP 6

STEP 7

BATTERY MODULES HAVING INTERCONNECT MEMBERS WITH VIBRATION DAMPENING PORTIONS

BACKGROUND

Battery modules have utilized interconnect members to electrically couple battery terminals together. However, when an interconnect member is ultrasonically welded to a battery terminal, the interconnect member may transmit vibrations therethrough which degrade prior weld joints on the interconnect member.

The inventors herein have recognized a need for an improved interconnect member that minimizes and/or eliminates the above-mentioned deficiency.

SUMMARY

An interconnect member for a battery module in accordance with an exemplary embodiment is provided. The interconnect member includes a first plate portion having a first thickness. The interconnect member further includes a second plate portion having a second thickness equal to the first thickness. The second plate portion extends generally parallel to the first plate portion. The interconnect member further includes a first vibration dampening portion coupled to the first and second plate portions. The first vibration dampening portion has a third thickness greater than the first thickness, such that vibrations induced on the first plate portion are attenuated when a portion of the vibrations pass through the first vibration dampening portion to the second plate portion.

A battery module in accordance with another exemplary embodiment is provided. The battery module includes a first battery cell having at least a first terminal, and a second battery cell having at least a second terminal. The battery module further includes an interconnect member having a first plate portion having a first thickness that is welded to the first terminal. The interconnect member further includes a second plate portion having a second thickness equal to the first thickness that is welded to the second terminal. The second plate portion extends generally parallel to the first plate portion. The interconnect member further includes a first vibration dampening portion coupled to the first and second plate portions. The first vibration dampening portion has a third thickness greater than the first thickness, such that vibrations induced on the first plate portion are attenuated when a portion of the vibrations pass through the first vibration dampening portion to the second plate portion.

An interconnect member for a battery module in accordance with another exemplary embodiment is provided. The interconnect member includes a first plate portion having a first thickness. The interconnect member further includes a second plate portion having a second thickness equal to the first thickness. The second plate portion extends generally parallel to the first plate portion. The interconnect member further includes a third plate portion having a third thickness equal to the first thickness. The third plate portion extends generally parallel to the second plate portion. The interconnect member further includes first and second first vibration dampening portions disposed generally perpendicular to the first, second, and third plate portions. The first vibration dampening portion is coupled to the first plate portion and the second vibration dampening portion. The second vibration dampening portion is coupled to the second plate portion and the third plate portion. The second vibration dampening portion has a fourth thickness greater than the first thickness, such that vibrations induced on the first plate portion are attenuated when a portion of the vibrations pass through the first vibration dampening portion and the second vibration dampening portion to the second plate portion.

A battery module in accordance with another exemplary embodiment is provided. The battery module includes a first battery cell having at least a first terminal. The battery module further includes a second battery cell having at least a second terminal. The battery module further includes a third battery cell having at least a third terminal. The battery module further includes an interconnect member having a first plate portion having a first thickness that is welded to the first terminal. The interconnect member further includes a second plate portion having a second thickness equal to the first thickness that is welded to the second terminal. The second plate portion extends generally parallel to the first plate portion. The interconnect member further includes a third plate portion having a third thickness equal to the first thickness that is welded to the third terminal. The third plate portion extends generally parallel to the second plate portion. The interconnect member further includes first and second first vibration dampening portions disposed generally perpendicular to the first, second, and third plate portions. The first vibration dampening portion is coupled to the first plate portion and the second vibration dampening portion. The second vibration dampening portion is coupled to the second plate portion and the third plate portion. The second vibration dampening portion has a fourth thickness greater than the first thickness, such that vibrations induced on the first plate portion are attenuated when a portion of the vibrations pass through the first vibration dampening portion and the second vibration dampening portion to the second plate portion.

DETAILED DESCRIPTION

Figure 1:
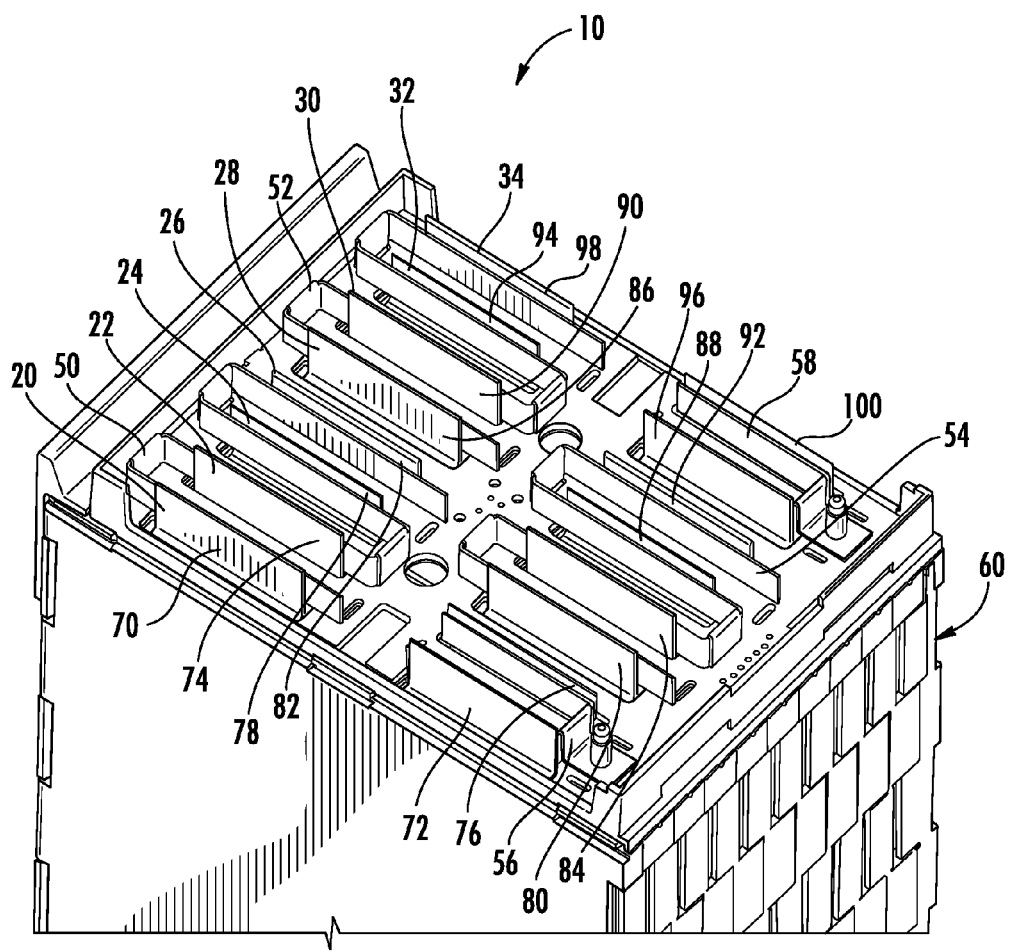
FIG. 1 is a schematic of a battery module having interconnect members in accordance with an exemplary embodiment.
Figure 2:
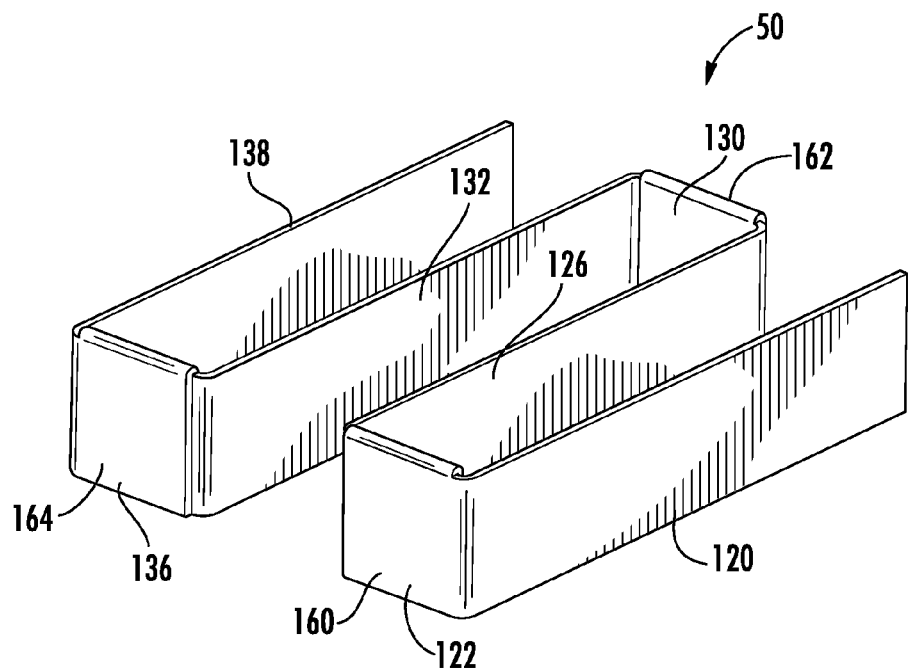
FIG. 2 is a schematic of an interconnect member utilized in the battery module of FIG. 1 in accordance with another exemplary embodiment.

Referring to FIG. 1, a battery module 10 in accordance with an exemplary embodiment is illustrated. The battery module 10 includes battery cells 20, 22, 24, 26, 28, 30, 32, 34, interconnect members 50, 52, 54, 56, 58, and a housing 60. An advantage of the battery module 10 is that the battery module 10 utilizes interconnect members that have vibration dampening portions to attenuate vibrations. As a result, when a battery terminal is ultrasonically welded to a region of the interconnect member, vibrations are attenuated in other regions of the interconnect member to reduce degradation of prior weld joints in other regions of the interconnect member.

Before describing the interconnect members in greater detail, a brief explanation of the battery cells 20-34 will be provided. The battery cells 20-34 have pouch shaped bodies (not shown) that are contained within the housing 60. Each of the battery cells 20-34 further include a pair of terminals that are operably coupled to the pouch shaped bodies and extend out of the housing 60. In particular, the battery cell 20 includes terminals 70, 72, and the battery cell 22 includes terminals 74, 76. Further, the battery cell 24 includes terminals 78, 80, and the battery cell 26 includes terminals 82, 84. Also, the battery cell 28 includes terminals 86, 88, and the battery cell 30 includes terminals 90, 92. Still further, the battery cell 32 includes terminals 94, 96, and the battery cell 34 includes terminals 98, 100.

The interconnect members 50-58 are provided to electrically couple the battery cells 20-34 in series with one another. In one exemplary embodiment, the interconnect members 50-58 are constructed of copper. Of course, in alternative embodiments, other bendable electrically-conductive materials known to those skilled in the art could be utilized to construct the interconnect members 50-58. The interconnect member 50 is electrically coupled to terminals 70, 74, 78, 82 via weld joints; the interconnect member 52 is electrically coupled to terminals 86, 90, 94, 98 via weld joints; and the interconnect member 54 is electrically coupled to terminals 80, 84, 88, 92 via weld joints. Finally, the interconnect member 56 is electrically coupled to terminals 72, 76 via weld joints, and the interconnect member 58 is electrically coupled to terminals 96, 100 via weld joints.

The interconnect members 50, 52, 54 have a substantially similar structure in accordance with an exemplary embodiment. Accordingly, only the structure of the interconnect member 50 will be described in greater detail below.

Referring to FIGS. 3-12, a process of folding plate portions of a plate member 51 to construct the interconnect member 50 will be explained.

Figure 3:
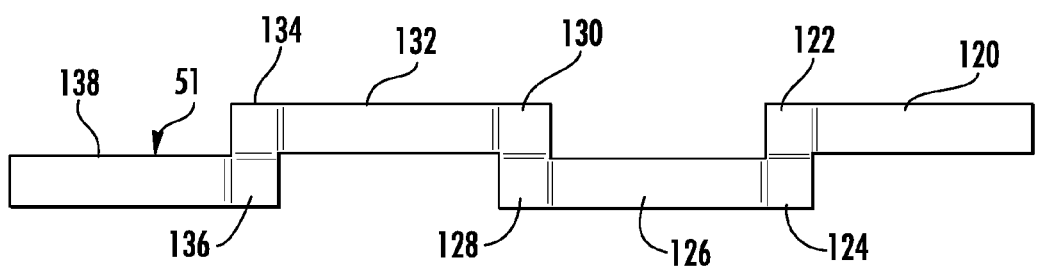
FIGS. 3-12 are schematics of a plate member having plate portions that are folded to obtain the interconnect member of FIG. 2.

Referring to FIG. 3, the plate member 51 includes plate portions 120, 122, 124, 126, 128, 130, 132, 134, 136, 138 and bendable regions 140, 141, 142, 144, 145, 146, 148, 149, 150. As shown, initially, the plate portions 120-138 are disposed substantially co-planar with one another. Each of the plate portions 120-138 have a same thickness.

Figure 4:
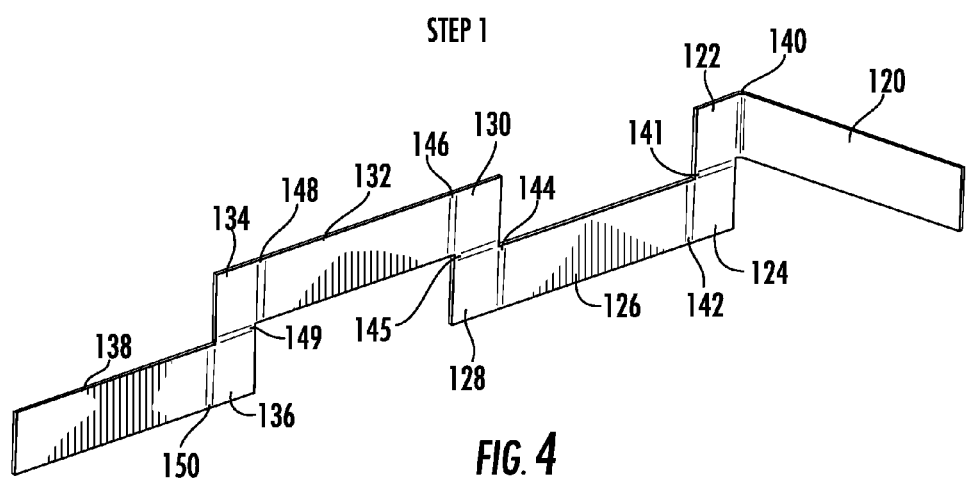

Referring to FIG. 4, during a first bending step, a user bends the plate portion 120 about the bendable region 140 such that the plate portion 120 is disposed substantially perpendicular to the plate portion 122, and the plate portion 120 extends in a first direction.

Figure 5:
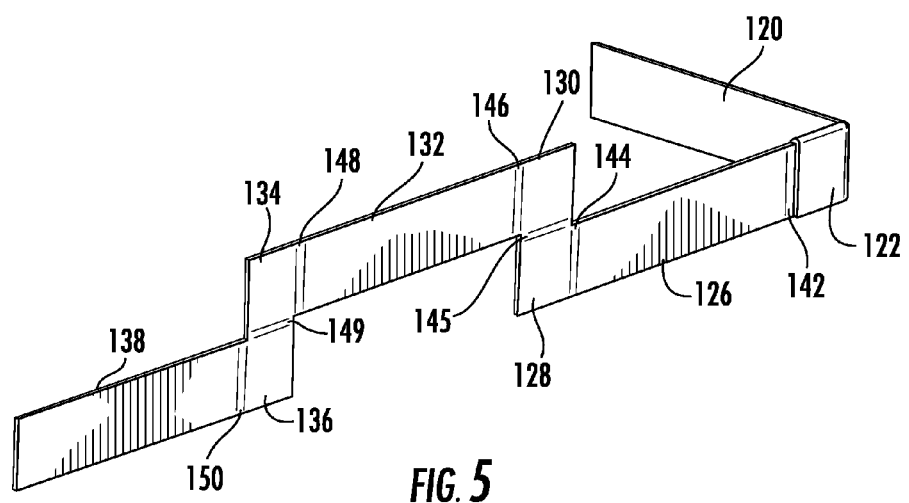

Referring to FIG. 5, during a second bending step, the user bends the plate portion 122 about the bendable region 141 such that the plate portion 122 contacts the plate portion 124, and the plate portion 120 is disposed in a second direction opposite to the first direction.

Figure 6:
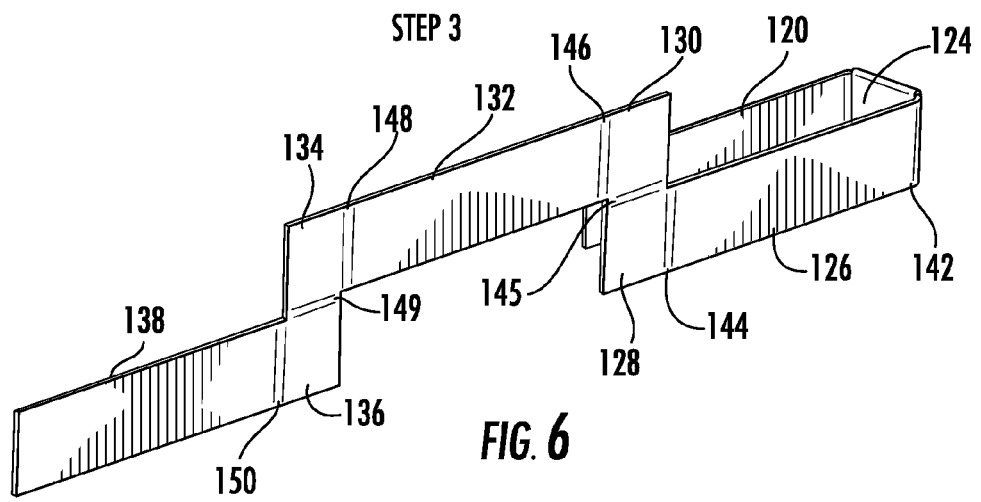

Referring to FIG. 6, during a third bending step, the user bends the plate portion 124 about the bendable region 142 such that the plate portion 124 is disposed perpendicular to the plate portion 126, and the plate portion 120 is disposed parallel to the plate portion 126.

Figure 7:
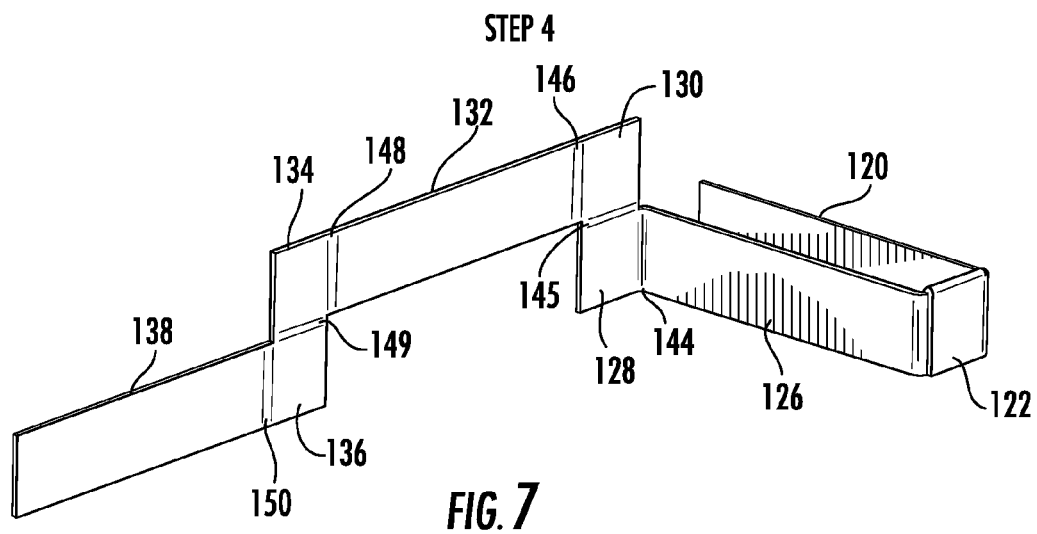

Referring to FIG. 7, during a fourth bending step, the user bends the plate portion 126 about the bendable region 144 such that the plate portion 126 is disposed perpendicular to the plate portion 128.

Figure 8:
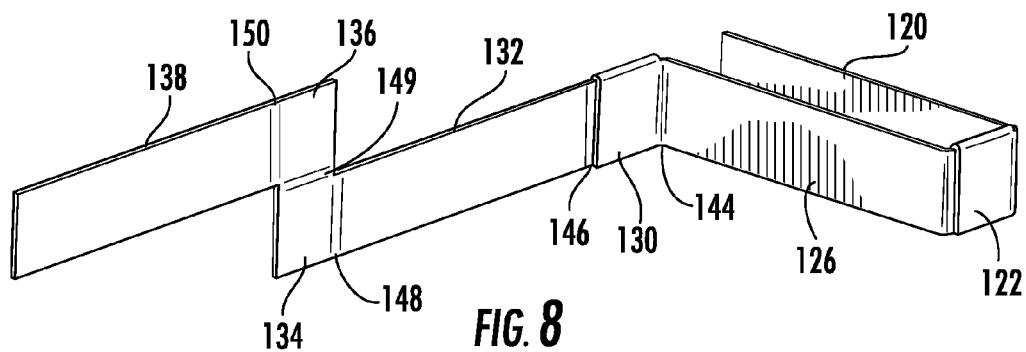

Referring to FIG. 8, during a fifth bending step, the user bends the plate portion 130 about the bendable region 145 such that the plate portion 130 contacts the plate portion 128.

Figure 9:
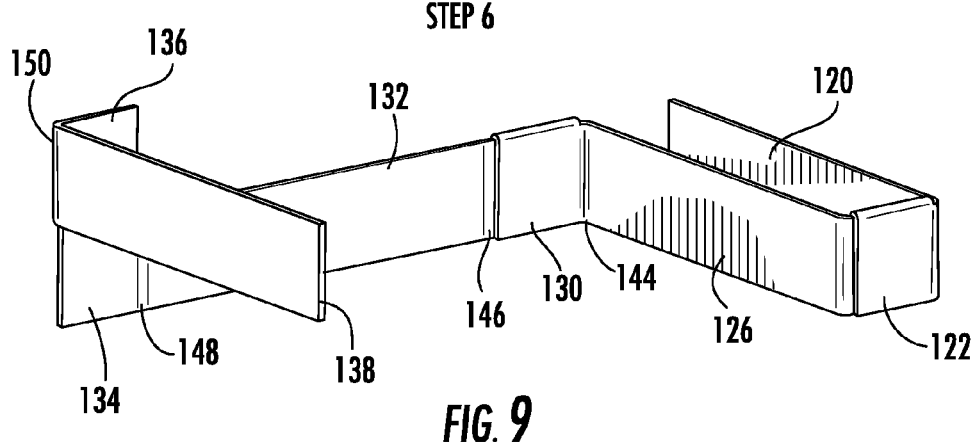

Referring to FIG. 9, during a sixth bending step, the user bends the plate portion 138 about the bendable region 150 such that the plate portion 138 is disposed perpendicular to the plate portion 136.

Figure 10:
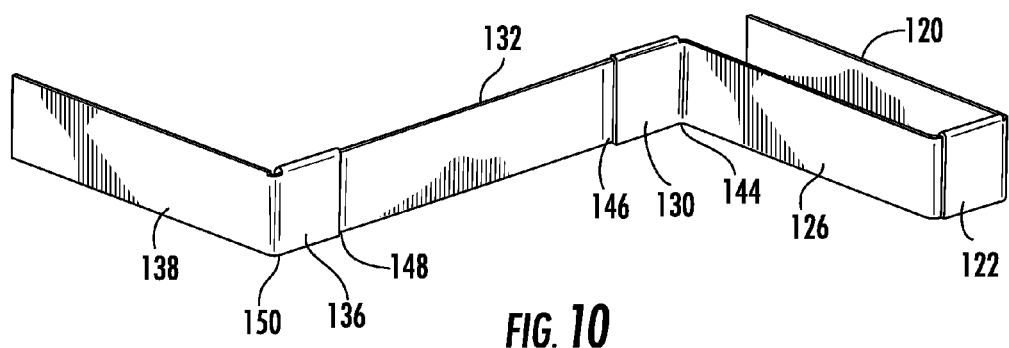

Referring to FIGS. 8 and 10, during a seventh bending step, the user bends the plate portion 136 about the bendable region 149 such that the plate portion 136 contacts the plate portion 134.

Figure 11:
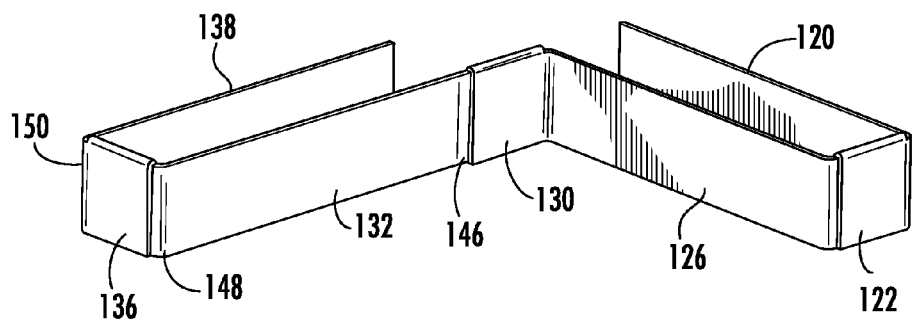

Referring to FIG. 11, during an eighth bending step, the user bends the plate portion 136 about the bendable region 148 such that the plate portion 136 is perpendicular to the plate portion 132.

Figure 12:
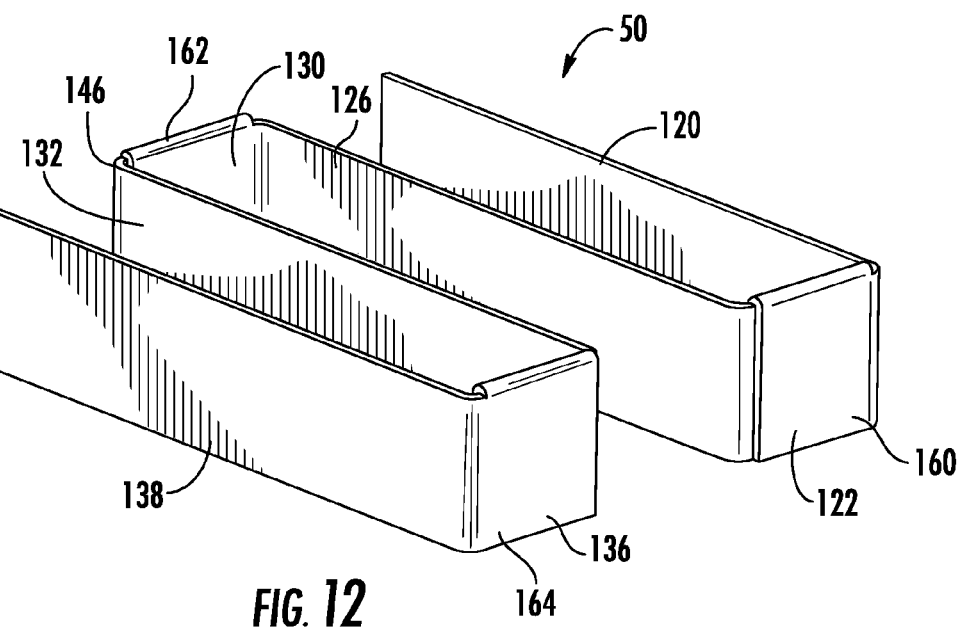

Referring to FIG. 12, during a ninth bending step, the user bends the plate portion 132 about the bendable region 146 such that the plate portion 132 is disposed parallel to the plate portion 126, to obtain the interconnect member 50.

Figure 13:
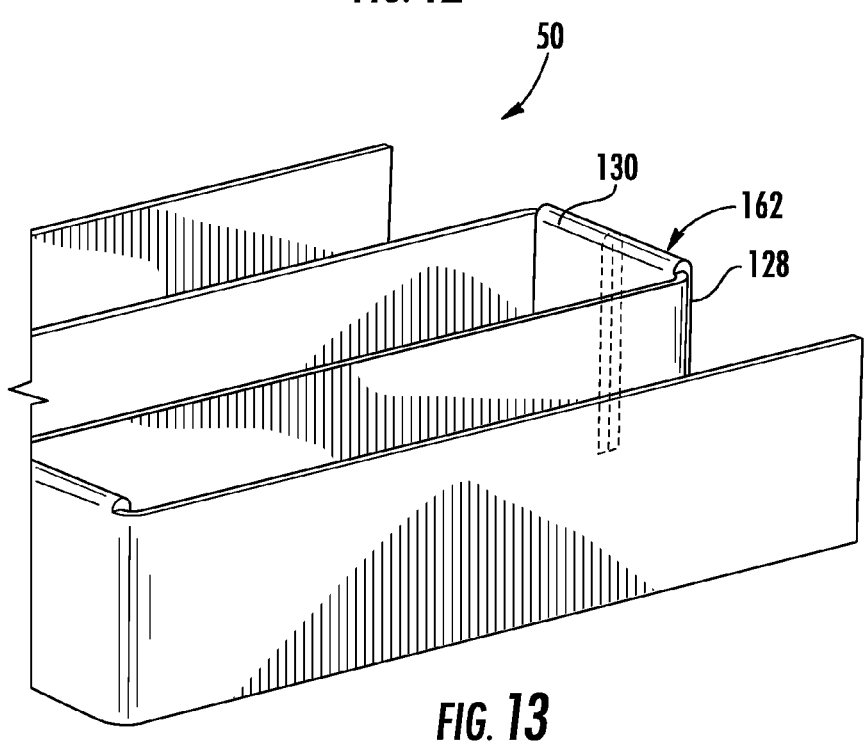
FIG. 13 is a schematic of a portion of the interconnect member of FIG. 2 illustrating vibration dampening portions.
Figure 14:
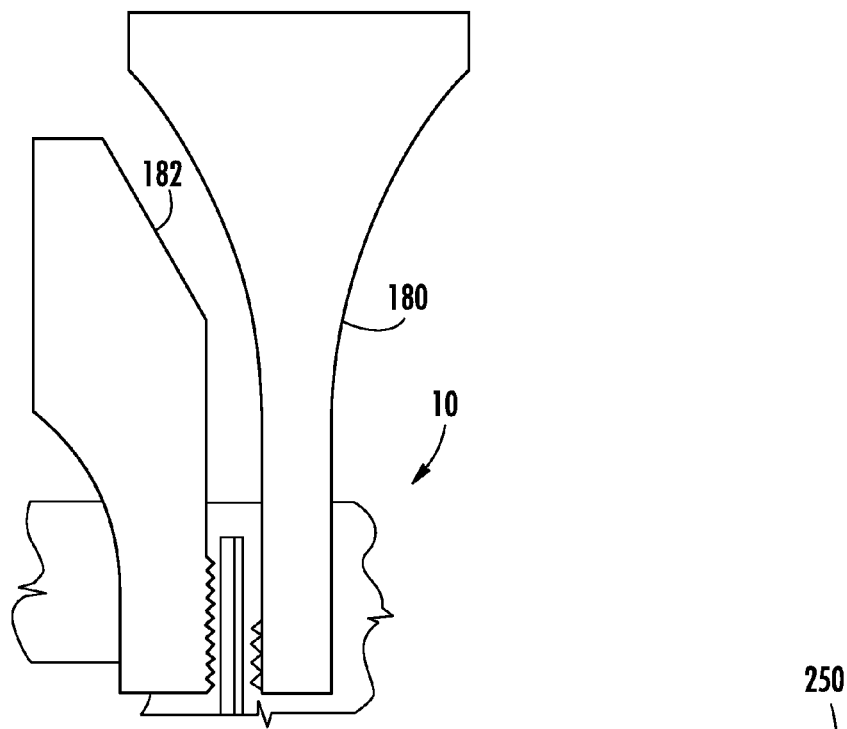
FIG. 14 is a schematic of a welding horn and an anvil utilized to weld battery terminals to the interconnect member of FIG. 2.

Referring to FIGS. 12-14, the interconnect member 50 has vibration dampening portions 160, 162, 164. The vibration dampening portions 160, 162, 164 attenuate vibrations that can occur during ultrasonic welding of battery terminals to the plate portions 120, 126, 132, 138 utilizing the ultrasonic horn 180 and the anvil 182. For example, when a battery terminal is ultrasonically welded to the plate portion 138, the vibration dampening portion 164 attenuates the vibrations before the vibrations reach the plate portion 132. The vibration dampening portion 162 further attenuates the vibrations before the vibrations reach the plate portion 126. Further, the vibration dampening portion 160 further attenuates the vibrations before the vibrations reach the plate portion 120.

The vibration dampening portion 160 comprises plate portions 122, 124 disposed between and coupled to the plate portions 120, 126. The vibration dampening portion 160 has a thickness that is twice as thick as a thickness of each of the plate portions 120, 126.

The vibration dampening portion 162 comprises plate portions 128, 130 disposed between and coupled to the plate portions 126, 132. The vibration dampening portion 162 has a thickness that is twice as thick as a thickness of each of the plate portions 126, 132.

The vibration dampening portion 164 comprises plate portions 134, 136 disposed between and coupled to the plate portions 132, 138. The vibration dampening portion 164 has a thickness that is twice as thick as a thickness of each of the plate portions 132, 138.

Figure 15:
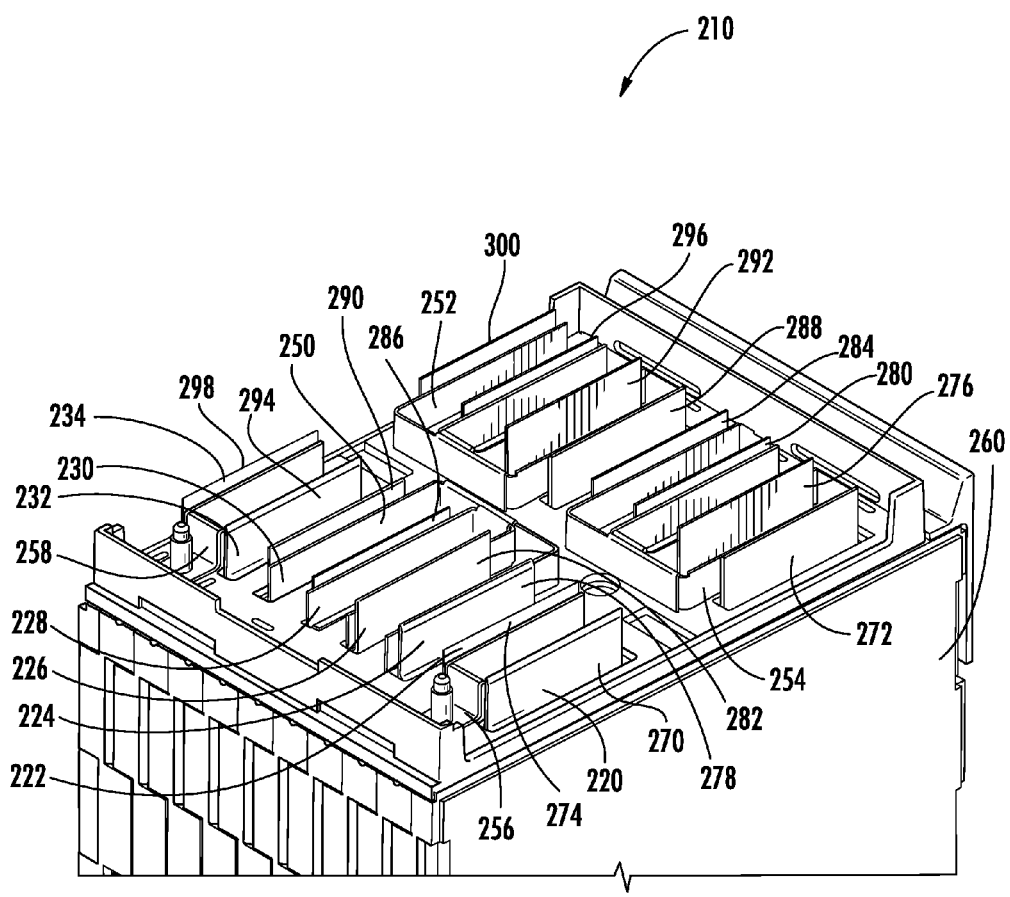
FIG. 15 is a schematic of another battery module having interconnect members in accordance with another exemplary embodiment.

Referring to FIG. 15, a battery module 210 in accordance with another exemplary embodiment is illustrated. The battery module 210 includes battery cells 220, 222, 224, 226, 228, 230, 232, 234, interconnect members 250, 252, 254, 256, 258, and a housing 260. An advantage of the battery module 210 is that the battery module 210 utilizes interconnect members that have vibration dampening portions to attenuate vibrations. As a result, when a battery terminal is ultrasonically welded to a region of the interconnect member, vibrations are attenuated in other regions of the interconnect member to reduce degradation of prior weld joints in other regions of the interconnect member.

Before describing the interconnect members in greater detail, a brief explanation of the battery cells 220-234 will be provided. The battery cells 220-234 have pouch shaped bodies (not shown) that are contained within the housing 260. Each of the battery cells 220-234 further include a pair of terminals that are operably coupled to the pouch shaped bodies and extend out of the housing 260. In particular, the battery cell 220 includes terminals 270, 272, and the battery cell 222 includes terminals 274, 276. Further, the battery cell 224 includes terminals 278, 280, and the battery cell 226 includes terminals 282, 284. Also, the battery cell 228 includes terminals 286, 288, and the battery cell 230 includes terminals 290, 292. Still further, the battery cell 232 includes terminals 294, 296, and the battery cell 234 includes terminals 298, 300.

The interconnect members 250-258 are provided to electrically couple the battery cells 220-234 in series with one another. In one exemplary embodiment, the interconnect members 250-258 are constructed from copper. Of course, in alternative embodiments, other bendable electrically-conductive materials known to those skilled in the art could be utilized to construct the interconnect members 250-258. The interconnect member 250 is electrically coupled to terminals 278, 282, 286, 290 via weld joints; and the interconnect member 252 is electrically coupled to the terminals 288, 292, 296, 300 via weld joints. The interconnect member 254 is electrically coupled to the terminals 272, 276, 280, 284 via weld joints; and the interconnect member 256 is electrically coupled to the terminals 270, 274 via weld joints. Further, the interconnect member 258 is electrically coupled to the terminals 294, 298 via weld joints.

The interconnect members 250, 252, 254 have a substantially similar structure in accordance with another exemplary embodiment. Accordingly, only the structure of the interconnect member 250 will be described in greater detail below.

Referring to FIGS. 17-24, a process of folding plate portions of a plate member 251 to construct the interconnect member 250 will be explained.

Figure 17:
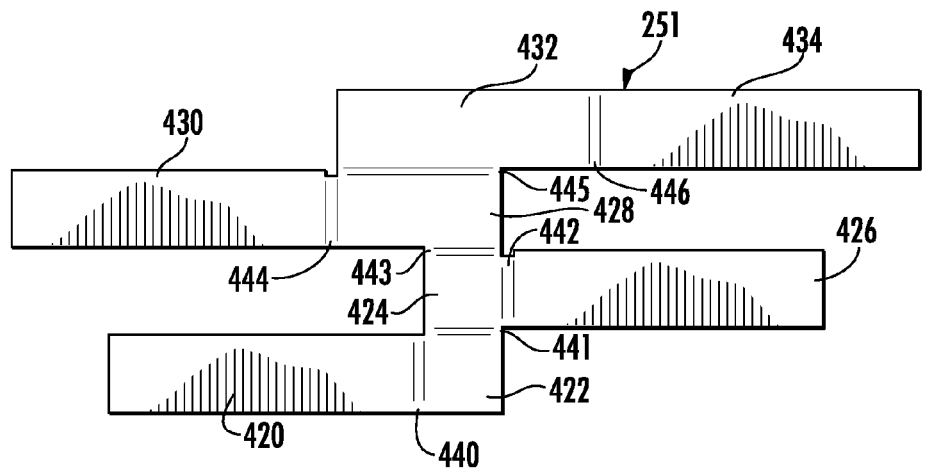
FIGS. 17-24 are schematics of a plate assembly having plate portions that are folded to obtain the interconnect member of FIG. 16.

Referring to FIG. 17, the plate member 251 includes plate portions 420, 422, 424, 426, 428, 430, 432, 434 and bendable regions 440, 441, 442, 443, 444, 445, 446. As shown, initially, the plate portions 420-434 are disposed substantially co-planar with one another. Each of the plate portions 420-434 have a same thickness.

Figure 18:
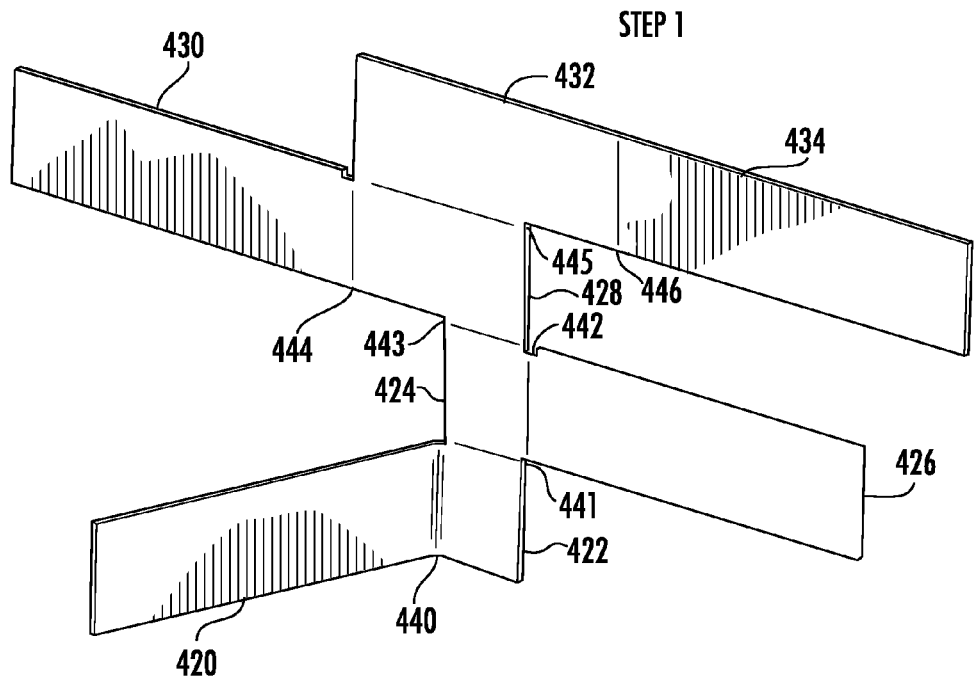

Referring to FIG. 18, during a first bending step, a user bends the plate portion 420 about the bendable region 440 such that the plate portion 420 is disposed substantially perpendicular to the plate portion 422, and the plate portion 120 extends in a first direction.

Figure 19:
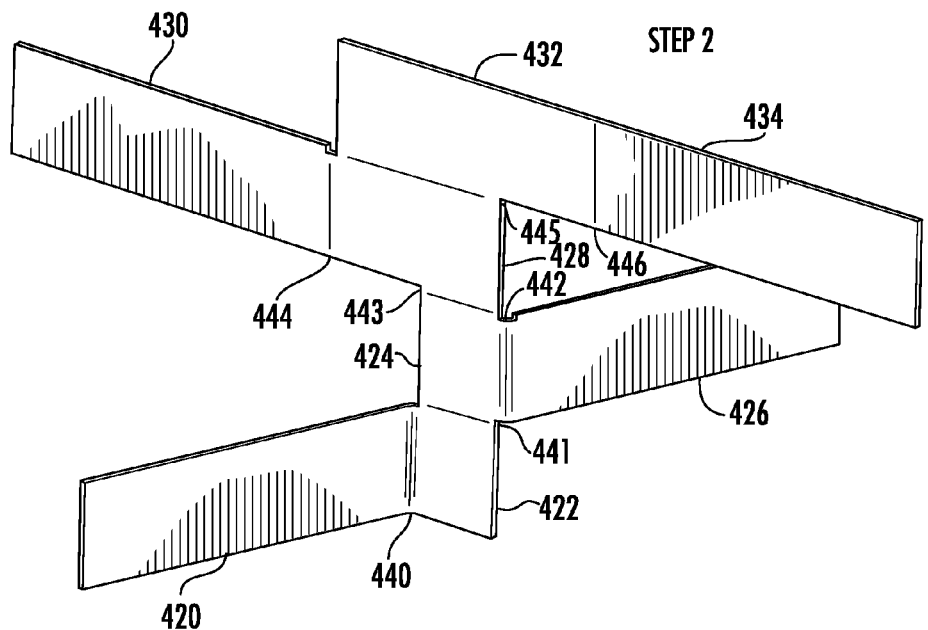

Referring to FIG. 19, during a second bending step, the user bends the plate portion 426 about the bendable region 442 such that the plate portion 426 is disposed substantially perpendicular to the plate portion 424, and the plate portion 426 extends in a second direction.

Figure 20:
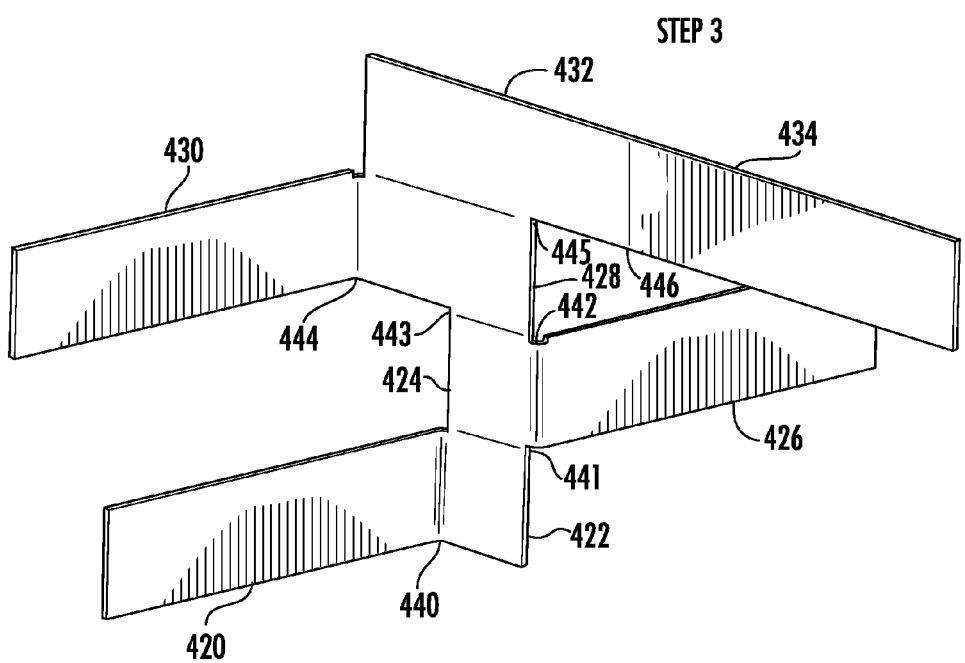

Referring to FIG. 20, during a third bending step, the user bends the plate portion 430 about the bendable region 444 such that the plate portion 430 is disposed substantially perpendicular to the plate portion 428, and the plate portion 430 extends in the first direction.

Figure 21:
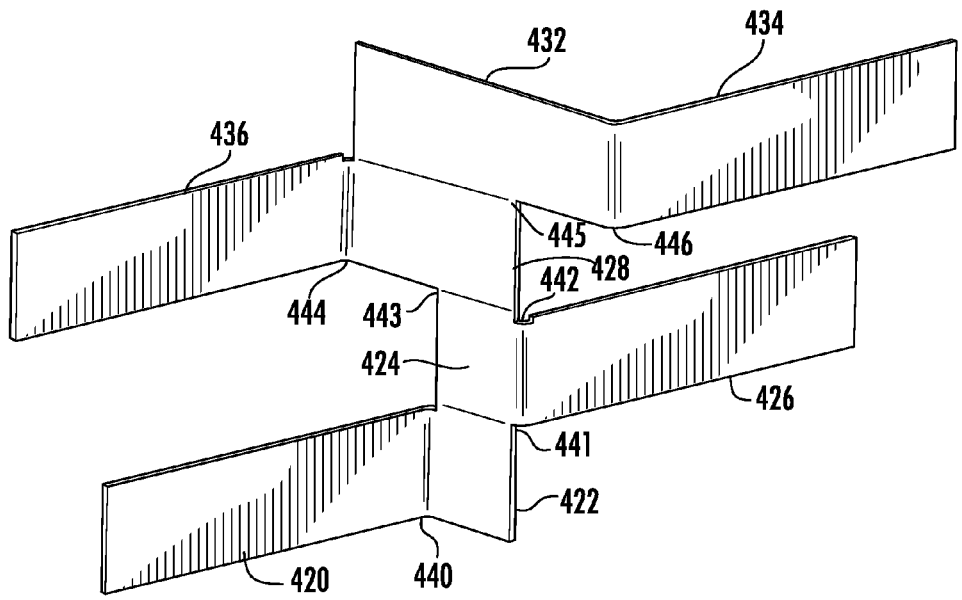

Referring to FIG. 21, during a fourth bending step, the user bends the plate portion 434 about the bendable region 446 such that the plate portion 434 is disposed substantially perpendicular to the plate portion 432, and the plate portion 434 extends in the second direction.

Figure 22:
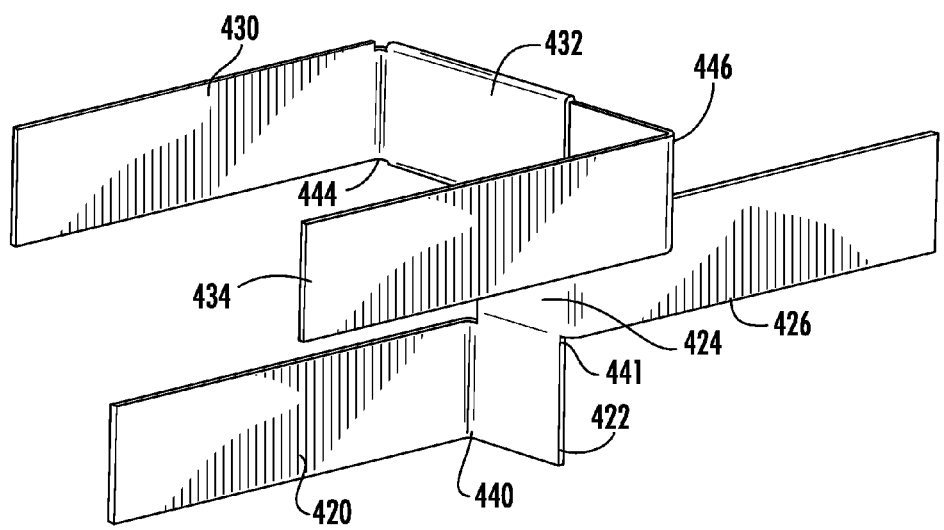

Referring to FIG. 22, during a fifth bending step, the user bends the plate portion 432 about the bendable region 445 such that the plate portion 432 is disposed adjacent to and contacts the plate portion 428.

Figure 23:
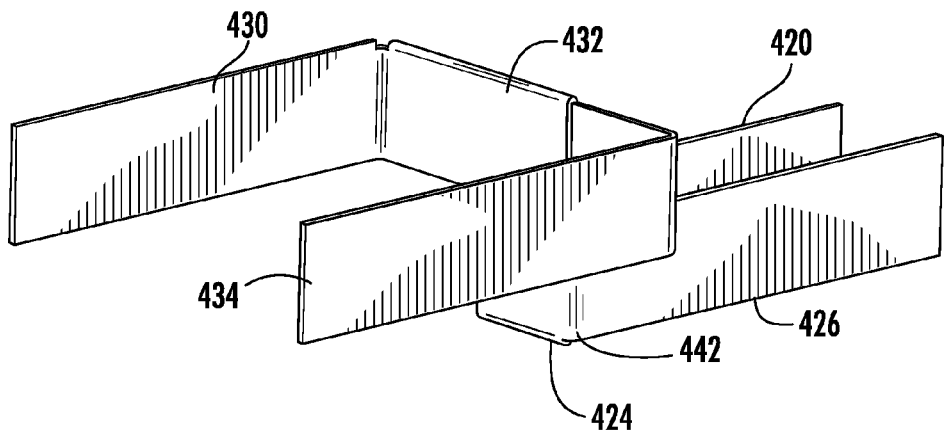

Referring to FIG. 23, during a sixth bending step, the user bends the plate portion 422 about the bendable region 441 such that the plate portion 422 is disposed adjacent to the plate portion 424, and the plate portion 420 is disposed substantially parallel to the plate portion 426.

Figure 24:
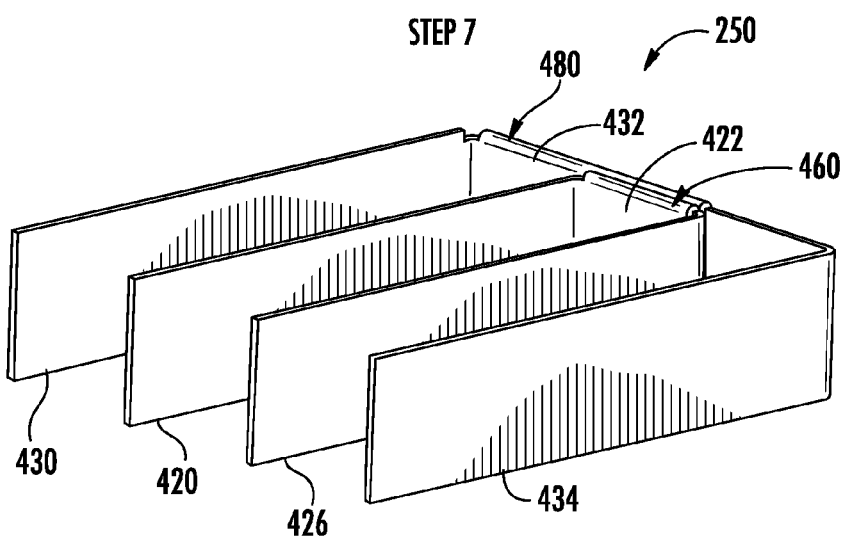

Referring to FIGS. 21 and 24, during a seventh bending step, the user bends the plate portion 424 about the bendable region 443 such that the plate portion 424 is disposed adjacent to and contacts the plate portion 432, to obtain the interconnect member 250.

Figure 16:
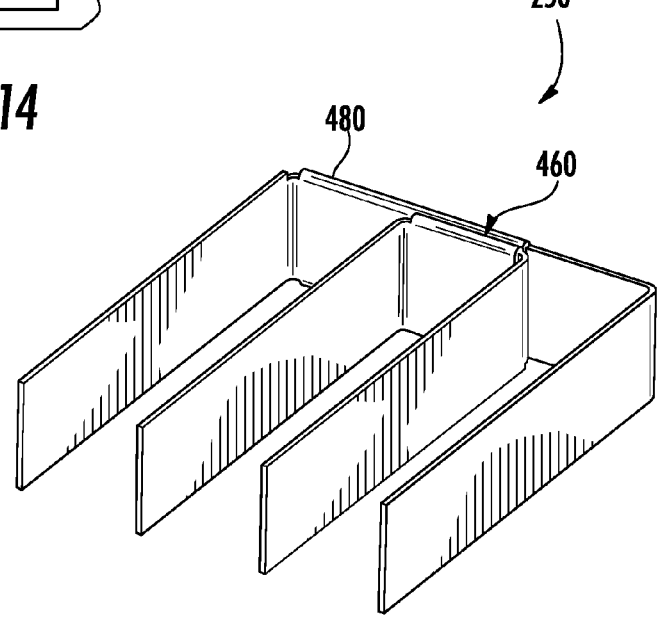
FIG. 16 is a schematic of an interconnect member utilized in the battery module of FIG. 15 in accordance with another exemplary embodiment.
Figure 25:
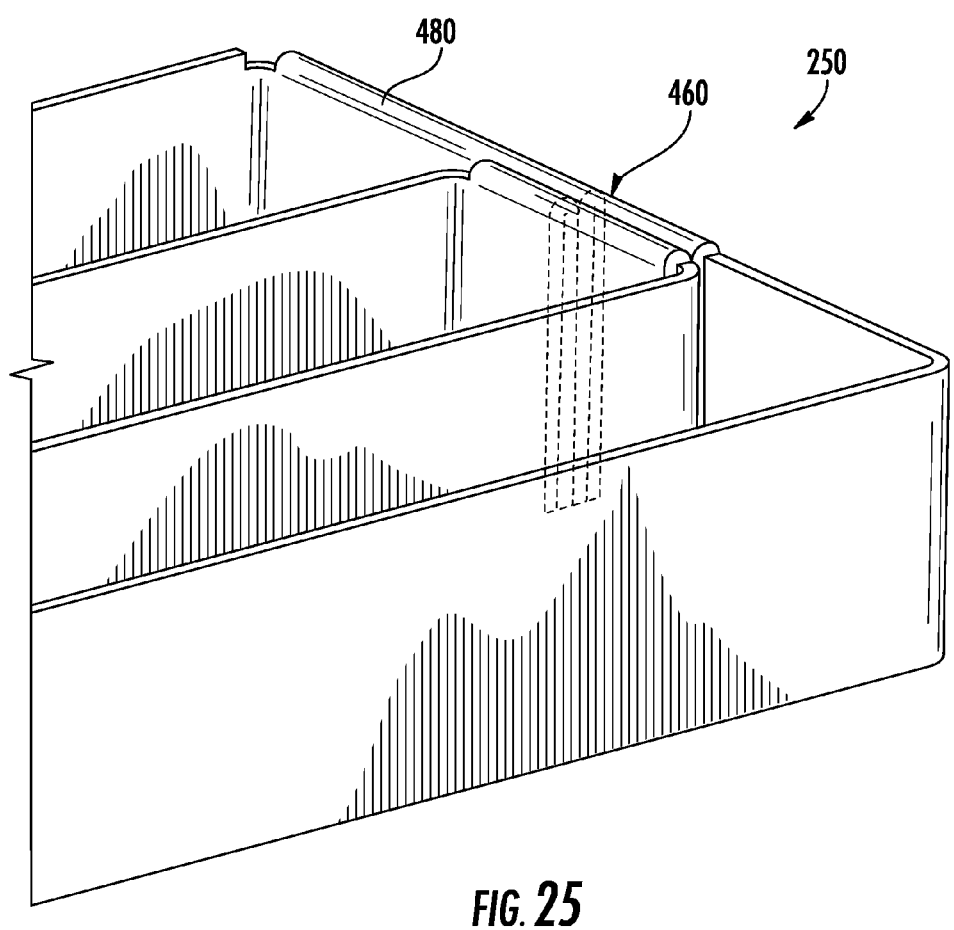
FIG. 25 is a schematic of a portion of the interconnect member of FIG. 16 illustrating vibration dampening portions.

Referring to FIGS. 16, 24 and 25, the interconnect member 250 has vibration dampening portions 460 and 480. The vibration dampening portions 460 and 480 attenuate vibrations that can occur during ultrasonic welding of battery terminals to the plate portions 420, 426, 430, 434 utilizing the ultrasonic horn 180 and the anvil 182. For example, when a battery terminal is ultrasonically welded to the plate portion 434, the vibration dampening portion 460 attenuates the vibrations before the vibrations reach the plate portions 426, 420. The vibration dampening portion 480 further attenuates the vibrations before the vibrations reach the plate portion 430.

The vibration dampening portion 460 comprises plate portions 422, 424, 428, and a portion of the plate portion 432 disposed between and coupled to the plate portions 426, 420. The vibration dampening portion 460 has a thickness that is four times as thick as a thickness of each of the plate portions 420, 426, 430, 434.

The vibration dampening portion 480 comprises plate portions 432, 428 disposed between and coupled to the plate portions 420, 430. The vibration dampening portion 480 has a thickness that is twice as thick as a thickness of each of the plate portions 430, 420.

The battery modules and interconnect members described herein provide a substantial advantage over other battery modules and interconnect members. In particular, the battery modules provide a technical effect of utilizing interconnect members with vibration dampening portions to attenuate vibrations in the interconnect member. As a result, when terminals are ultrasonically welded to the interconnect members, previously formed weld joints are less likely to be degraded.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

We claim:

1. A battery module, comprising:
    a first battery cell having at least a first terminal;
    a second battery cell having at least a second terminal;
    a third battery cell having at least a third terminal;
    an interconnect member having:
        a first electrically-conductive plate portion having a first thickness and being welded to the first terminal, the first electrically-conductive plate portion having first and second ends;

a second electrically-conductive plate portion having a second thickness equal to the first thickness and being welded to the second terminal, the second electrically-conductive plate portion extending generally parallel to the first electrically-conductive plate portion, the second electrically-conductive plate portion having first and second ends, the first end of the second electrically-conductive plate portion being spaced apart from the first end of the first electrically-conductive plate portion a first distance, the second end of the second electrically-conductive plate portion being spaced apart from the second end of the first electrically-conductive plate portion a second distance such that the second end of the second electrically-conductive plate portion and the second end of the first electrically-conductive plate portion have a first gap therebetween that extends completely across the second distance, the second distance being substantially equal to the first distance;

a third electrically-conductive plate portion having a third thickness equal to the first thickness and being welded to the third terminal, the third electrically-conductive plate portion extending generally parallel to the second electrically-conductive plate portion, the third electrically-conductive plate portion having first and second ends, the second end of the third electrically-conductive plate portion being spaced apart from the second end of the second electrically-conductive plate portion a third distance, the first end of the third electrically-conductive plate portion being spaced apart from the first end of the second electrically-conductive plate portion of a fourth distance such that the first end of the third electrically-conductive plate portion and the first end of the second electrically-conductive plate portion have a second gap therebetween that extends completely across the fourth distance, the third distance being substantially equal to the fourth distance;

a first electrically-conductive vibration dampening portion directly coupled to and between the first end of the first electrically-conductive plate portion and the first end of the second electrically-conductive plate portion, the first electrically-conductive vibration dampening portion extending perpendicular to the first terminal of the first battery cell, the first electrically-conductive vibration dampening portion having a fourth thickness greater than the first thickness along an entire length of the first electrically-conductive vibration dampening portion, such that vibrations induced on the first electrically-conductive plate portion are attenuated when a portion of the vibrations induced in the first electrically-conductive plate portion pass through the first electrically-conductive vibration dampening portion to the second electrically-conductive plate portion; and a second electrically-conductive vibration dampening portion directly coupled to and between the second end of the second electrically-conductive plate portion and the second end of the third electrically-conductive plate portion, the second electrically-conductive vibration dampening portion extending perpendicular to the second terminal of the second battery cell, the second electrically-conductive vibration dampening portion having a fifth thickness greater than the second thickness along an entire length of the second electrically-conductive vibration dampening portion, such that vibrations induced on the second electrically-conductive plate portion are attenuated when a portion of the vibrations induced on the second electrically-conductive plate portion pass through the second electrically-conductive vibration dampening portion to the third electrically-conductive plate portion.

2. The battery module of claim 1, wherein the first electrically-conductive vibration dampening portion is constructed of fourth and fifth electrically-conductive plate portions, the fifth electrically-conductive plate portion being bent such that a surface of the fifth electrically-conductive plate portion contacts a surface of the fourth electrically-conductive plate portion.

3. The battery module of claim 1, wherein the second electrically-conductive vibration dampening portion is parallel to the first electrically-conductive vibration dampening portion.

4. The battery module of claim 1, wherein the fourth thickness is at least twice as thick as the first thickness.

5. The battery module of claim 1, wherein the first electrically-conductive plate portion, the second electrically-conductive plate portion, and the first electrically-conductive vibration dampening portion are each constructed of copper.

6. The battery module of claim 1, wherein the first and second electrically-conductive vibration dampening portions are parallel to one another.

7. The battery module of claim 6, wherein the first and second electrically-conductive vibration dampening portions each have a thickness equal to one another.

8. The battery module of claim 1, wherein the first and second electrically-conductive plate portions have first and second major surfaces, respectively, facing one another that extend parallel to one another and are not co-planar with one another.

9. A battery module, comprising:
a first battery cell having at least a first terminal;
a second battery cell having at least a second terminal;
a third battery cell having at least a third terminal;
a fourth battery cell having at least a fourth terminal;
an interconnect member having:
a first copper plate portion having a first thickness that is welded to the first terminal, the first copper plate portion having first and second ends;
a second copper plate portion having a second thickness equal to the first thickness that is welded to the second terminal, the second copper plate portion extending generally parallel to the first copper plate portion, the second copper plate portion having first and second ends, the first end of the second copper plate portion being spaced apart from the first end of the first copper plate portion of a first distance, the second end of the second copper plate portion being spaced apart from the second end of the first copper plate portion a second distance such that the second end of the second copper plate portion and the second end of the first copper plate portion have a first gap therebetween that extends completely across the second distance;
a third copper plate portion having a third thickness equal to the first thickness that is welded to the third terminal, the third copper plate portion extending generally parallel to the second copper plate portion, the third copper plate portion having first and second ends, the second end of the third copper plate portion being spaced apart from the second end of the second copper plate portion a third distance, the first end of the third copper plate portion being spaced apart from the first end of the second copper plate portion a fourth distance such that the first end of the third copper plate portion and the first end of the second copper plate portion have a second gap therebetween that extends completely across the fourth distance; and a fourth copper plate portion having a fourth thickness equal to the first thickness that is welded to the fourth terminal, the fourth copper plate portion extending generally parallel to the third copper plate portion, the fourth copper plate portion having first and second ends;

first, second, and third copper vibration dampening portions disposed generally perpendicular to the first, second, third, and fourth copper plate portions;

the first copper vibration dampening portion directly coupled to and between the first end of the first copper plate portion and the first end of the second copper plate portion, the first copper vibration dampening portion extending perpendicular to the first terminal of the first battery cell, the first copper vibration dampening portion having a fifth thickness greater than the first thickness along an entire length of the first copper vibration dampening portion;

the second copper vibration dampening portion directly coupled to and between the second end of the second copper plate portion and the second end of the third copper plate portion, the second copper vibration dampening portion extending perpendicular to the second terminal of the second battery cell, the second copper vibration dampening portion having a sixth thickness greater than the first thickness along an entire length of the second copper vibration dampening portion, such that vibrations induced on the first copper plate portion are attenuated when a portion of the vibrations pass through the first copper vibration dampening portion and the second copper vibration dampening portion to the third copper plate portion; and the third copper vibration dampening portion directly coupled to and between the first end of the third copper plate portion and the first end of the fourth copper plate portion, the third copper vibration dampening portion extending perpendicular to the third terminal of the third battery cell, the third copper vibration dampening portion having a seventh thickness greater than the first thickness along an entire length of the third copper vibration dampening portion.

10. The battery module of claim 9, wherein the first, second, and third copper vibration dampening portions are parallel to one another.

11. The battery module of claim 10, wherein the first, second, and third copper vibration dampening portions each have a thickness equal to one another.

12. The battery module of claim 9, wherein the first and second copper plate portions have first and second major surfaces, respectively, facing one another that extend parallel to one another and are not co-planar with one another.

13. The battery module of claim 9, wherein the first distance is substantially equal to the second distance, and the third distance is substantially equal to the fourth distance.

14. A battery module, comprising:

a first battery cell having at least a first terminal;

a second battery cell having at least a second terminal;

a third battery cell having at least a third terminal;

an interconnect member having:

a first flat electrically-conductive plate portion having a first thickness and being welded to the first terminal, the first flat electrically-conductive plate portion having first and second ends;

a second flat electrically-conductive plate portion having a second thickness equal to the first thickness and being welded to the second terminal, the second flat electrically-conductive plate portion extending generally parallel to the first flat electrically-conductive plate portion, the second flat electrically-conductive plate portion having first and second ends, the first end of the second flat electrically-conductive plate portion being spaced apart from the first end of the first flat electrically-conductive plate portion a first distance, the second end of the second flat electrically-conductive plate portion being spaced apart from the second end of the first flat electrically-conductive plate portion a second distance such that the second end of the second flat electrically-conductive plate portion and the second end of the first flat electrically-conductive plate portion have a first gap therebetween that extends completely across the second distance, the first distance being substantially equal to the second distance;

a third flat electrically-conductive plate portion having a third thickness equal to the first thickness and being welded to the third terminal, the third flat electrically-conductive plate portion extending generally parallel to the second flat electrically-conductive plate portion, the third flat electrically-conductive plate portion having first and second ends, the second end of the third flat electrically-conductive plate portion being spaced apart from the second end of the second flat electrically-conductive plate portion a third distance, the first end of the third flat electrically-conductive plate portion being spaced apart from the first end of the second flat electrically-conductive plate portion a fourth distance such that the first end of the third flat electrically-conductive plate portion and the first end of the second flat electrically-conductive plate portion have a second gap therebetween that extends completely across the fourth distance, the third distance being substantially equal to the fourth distance;

a first electrically-conductive vibration dampening portion directly coupled to and between the first end of the first flat electrically-conductive plate portion and the first end of the second flat electrically-conductive plate portion, the first electrically-conductive vibration dampening portion extending perpendicular to the first and second flat electrically-conductive plate portions, the first electrically-conductive vibration dampening portion having a fourth thickness greater than the first thickness, such that vibrations induced on the first flat electrically-conductive plate portion are attenuated when a portion of the vibrations induced in the first flat electrically-conductive plate portion pass through the first electrically-conductive vibration dampening portion to the second flat electrically-conductive plate portion; and a second electrically-conductive vibration dampening portion directly coupled to and between the second end of the second flat electrically-conductive plate portion and the second end of the third flat electrically-conductive plate portion, the second electrically-conductive vibration dampening portion extending perpendicular to the second and third flat electrically-conductive plate portions, the second electrically-conductive vibration dampening portion having a fifth thickness greater than the second thickness, such that vibrations induced on the second flat electrically-conductive plate portion are attenuated when a portion of the vibrations induced on the second flat electrically-conductive plate portion pass through the second electrically-conductive vibration dampening portion to the third flat electrically-conductive plate portion.

15. The battery module of claim 14, wherein the first and second flat electrically-conductive plate portions have first and second major surfaces, respectively, facing one another that extend parallel to one another and are not co-planar with one another.

* * * * *